United States Patent [19]

Lee

[11] Patent Number: 5,781,265
[45] Date of Patent: Jul. 14, 1998

[54] NON-CHIRAL SMECTIC C LIQUID CRYSTAL DISPLAY

[75] Inventor: Sin-Doo Lee, Seoul, Rep. of Korea

[73] Assignee: Samsung Display Devices Co., Ltd., Kyungki-do, Rep. of Korea

[21] Appl. No.: 736,200

[22] Filed: Oct. 22, 1996

[30] Foreign Application Priority Data

Oct. 24, 1995 [KR] Rep. of Korea ............. 95-36688

[51] Int. Cl.$^6$ ............. G02F 1/139; G02F 1/1335; G02F 1/1337
[52] U.S. Cl. ............. 349/171; 349/99; 349/103; 349/136
[58] Field of Search ............. 349/171, 172, 349/173, 184, 99, 100, 132, 136, 103

[56] References Cited

U.S. PATENT DOCUMENTS

| | | | |
|---|---|---|---|
| Re. 34,966 | 6/1995 | Clark et al. | 349/172 |
| 3,775,757 | 11/1973 | Taylor et al. | 349/171 |
| 3,787,110 | 1/1974 | Berreman et al. | 349/123 |
| 4,291,948 | 9/1981 | Crossland et al. | 349/188 |
| 4,832,462 | 5/1989 | Clark et al. | 349/134 |
| 5,062,691 | 11/1991 | Tristani-Kendra et al. | 349/173 |
| 5,109,295 | 4/1992 | Sato et al. | 349/172 |
| 5,172,257 | 12/1992 | Patel | 349/37 |
| 5,214,523 | 5/1993 | Nito et al. | 349/173 |
| 5,479,281 | 12/1995 | Wiltshire et al. | 349/171 |

*Primary Examiner*—Hung X. Dang
*Assistant Examiner*—Tai V. Duong
*Attorney, Agent, or Firm*—Christie, Parker & Hale, LLP

[57] ABSTRACT

A liquid crystal display according to this invention has a pair of transparent electrodes, a non-chiral smectic liquid crystal therebetween, a polarizer and an analyzer which are attached to the electrodes. The smectic layers are perpendicular to the electrodes and the liquid crystal has a twisted structure where the twist angle is twice the molecular tilt angle. In this configuration, the molecular director is forced to continuously rotate along the cone surface formed by the requirement that the molecules are tilted with respect to the layer normal and pinned at the surfaces. The basic principles of the optical modulation in the present invention are similar to those in twist nematic liquid crystal structures.

19 Claims, 7 Drawing Sheets

PRIOR ART

NON-CHIRAL SMECTIC C LIQUID CRYSTAL DISPLAY

BACKGROUND OF THE INVENTION

1. Field of the Invention

This invention relates to a liquid crystal display, in particular, to a liquid crystal display using a non-chiral smectic C liquid crystal.

2. Description of the Related Art

Generally, a crystal has positional and orientational orders since its molecules are fixed in position and orientation. But both orders disappear when the crystal is melted to become an isotropic liquid. A liquid crystal is a phase or a state different from both the crystal and the liquid in that it has only the orientational order or it has the orientational order and the positional order in part.

Since a material in the liquid crystal phase has the orientational order and its molecules have asymmetrical shapes, it is called to be an anisotropic material having different physical properties due to its orientation.

Typical liquid crystal molecules have the shapes of thin and long bars. The long axis of the molecule is called the molecular axis and the molecules tend to arrange themselves such that the molecular axes be parallel on average. The direction along the average molecular axis is represented as a "director" and the degree of the orientational order is measured by the relations between the molecular axes and the director. That is, an order parameter which is the average value of $(3 \cos^2 \theta - 1)/2$ is used as a measure of the degree of the orientational order, where $\theta$ is an angle between the individual molecular axis and the director. The typical value of the order parameter lies between about 0.3 and 0.9, and the order parameter decreases as the temperature of the liquid crystal material increases.

The liquid crystals are classified by the type of order into three categories, i. e., nematic, cholesteric or chiral nematic and smectic liquid crystals.

A nematic liquid crystal has an orientational order but has no positional order. The positions of the molecules of the nematic liquid crystal are out of order, but there exist inter-molecular forces causing the molecules to be parallel on average in the nematic phase. Ferroelectricity is not appeared in the conventional nematic liquid crystals since the molecules possess up-down symmetry so that no net polarization from molecular dipole moments is expected. The nematic liquid crystals are commonly used in displays.

A chiral nematic liquid crystal is often thought to be different from a cholesteric liquid crystal, but these two liquid crystals are not necessarily distinct since their physical properties share some common features. The two liquid crystals have similar intermolecular forces causing the average molecular axis to rotate in space along the direction perpendicular to the director. This property present in the chiral nematic liquid crystal is called "chirality" and the distance within which the average molecular axis rotates by one turn is "pitch." It is noted that the non-chiral nematic liquid crystal also can have the twisted structure by means of alignment process. The chiral nematic materials are used in displays as well as in a microwave or an electromagnetic field detection.

A smectic liquid crystal has a more ordered structure, formed into smectic layers, than the above two liquid crystals do. The smectic liquid crystal has not only the orientational order but also the positional order in part. Therefore, the molecular positions have periodicity in the direction normal to the layers or the layer normal but they do not have long-range positional order in the layer plane.

Among the smectic liquid crystals, tilted chiral smectic liquid crystals show ferroelectricity, for instance, smectic C* liquid crystals. Recently, ferroelectric liquid crystals have been extensively studied. Smectic C liquid crystals are those having the molecular axes tilted with respect to the layer normal. The molecules of the smectic C* liquid crystal have optical activity so that they form a helical structure along the layer normal. The smectic C* liquid crystal exhibits a spontaneous polarization in a direction perpendicular to the director and the layer normal. The smectic C liquid crystal has rotational symmetry with respect to the axis perpendicular to the director and inversion symmetry with respect to the surface of the smectic layer. However, if the molecule has a chiral part, the inversion symmetry is broken and the transverse dipole moment produces the spontaneous polarization in the smectic C* phase. The macroscopic spontaneous polarization averaged over one period or one pitch is zero since the molecules in the smectic C* phase are helically arranged along the layer normal. Thus, this ferroelectric liquid crystal is called as an improper ferroelectric material. The helical structure can be distorted under an external electric field and completely unwound above a critical field strength, thereby a macroscopic spontaneous polarization being induced. The ferroelectric liquid crystal displays (hereinafter referred to as ferroelectric LCDs) have several problems such as the difficulty in alignment and fragile smectic layers.

The liquid crystals have anisotropic physical properties such as the electric and magnetic susceptibilities. As described above, this is because the molecules have the asymmetrical shapes of bars and thus anisotropic intermolecular forces in space.

For example, the electric susceptibility along the director is different from that: in the direction perpendicular to the director. Due to the difference in the electric susceptibility, the permittivity is also different.

Let the permittivity along the director to be $\epsilon_1$ and that in the direction perpendicular to the director to be $\epsilon_2$. Then, dielectric anisotropy $\Delta\epsilon$ is defined by $\Delta\epsilon=\epsilon_1-\epsilon_2$. Positive dielectric anisotropy is the case that $\Delta\epsilon>0$ and negative dielectric anisotropy is the one that $\Delta\epsilon<0$. When an electric field is applied to the liquid crystal, an electric displacement $D=\epsilon_2 E+\Delta\epsilon(n\cdot E)n$. The electrostatic energy $$-\int D \cdot dE = -(\tfrac{1}{2})\ \epsilon_2 E^2 - (\tfrac{1}{2})\Delta\epsilon(n\cdot E)^2.$$

This electrostatic energy competes with the elastic energy in order to reach a stable state. As a result, the director of the liquid crystal having the positive dielectric anisotropy tends to be parallel to the applied electric field while the director of the liquid crystal having the negative anisotropy tends to be perpendicular to the applied electric field.

LCDs use the anisotropic properties of the liquid crystal. A conventional LCD in the twisted nematic (TN) mode will be described in detail.

FIGS. 1A and 1B show a conventional TN LCD using positive dielectric anisotropy. FIG. 1A illustrates a state in which no electric field is applied across the liquid crystal and FIG. 1B illustrates a state in which the electric field is applied across it.

A liquid crystal having positive dielectric anisotropy is placed between the inner surfaces of two transparent substrates 11 and 12. On the outer surfaces of the substrates 11 and 12, a polarizer 13 and an analyzer 14 are attached, respectively. On the inner surface of each substrate 11 or 12, a transparent electrode 15 or 16 and an alignment layer 17 or 18 are formed. The alignment layers are treated so that the director at one surface is perpendicular to that at the other, thus making the director continuously to rotate by 90 degrees through the liquid crystal slab.

If the gap between the two substrates 11 and 12 is properly chosen, the polarization of the incident light passing through the liquid crystal slab can be changed in response to the molecular arrangement.

When an external voltage is applied between the transparent electrodes, the molecules in the bulk except for the surface region near the substrates 11 and 12 tend to orient along the direction of the electric field, i. e., to be perpendicular to the substrates 11 and 12. The arrows in FIGS. 1A and 1B represent the director.

Now, the operation of this TN LCD will be described.

In the "OFF" state in which no voltage across the substrates 11 and 12 is applied, the liquid crystal slab acts like a waveguiding plate for the incident light. A light incident on one substrate 11 is linearly polarized on passing through the polarizer 13 and its polarization rotates through the liquid crystal slab. When the polarized light reaches at the other substrate 12, its outcoming polarization rotates by 90 degrees. In the case that the polarization axes of the polarizer 13 and the analyzer 14 are perpendicular to each other, the light passes through the analyzer 14 since the polarization of the light is parallel to the polarization axis of the analyzer 14. However, if the polarization axes of the polarizer 13 and the analyzer 14 are parallel to each other, no light pass through the analyzer 14 since the polarization of the light is perpendicular to the polarization axis of the analyzer 14. In the "ON" state in which a voltage is applied between the two substrates 11 and 12, the molecular director becomes to be distorted. Since the liquid crystal has positive dielectric anisotropy, the director tends to orient along the direction of the electric field except for the surface region near the substrates 11 and 12. By controlling the strength of the electric field, the magnitude of the tilt angle of the director is controlled, causing the waveguiding effect of the liquid crystal layer to be changed. Under a sufficiently high electric field, a linearly polarized light through the polarizer 13 reaches at the analyzer 14 without rotation of its initial polarization, if the polarization axes of the polarizer 13 and the analyzer 14 are perpendicular to each other, the light: hardly passes through the analyzer 14. When the polarization axes of the polarizer 13 and the analyzer 14 are parallel to each other, the light passes through the analyzer 14.

Between the OFF state and the ON state the analog gray scale is obtained by controlling the strength of the applied electric field.

The twisted angle of the molecular director in the TN mode is 90 degrees while that in the super-twisted nematic (STN) mode is larger than that in the TN mode, for example, 220 degrees o r 270 degrees.

The conventional TN or STN LCD has several problems, such as narrow viewing angles and slow response because only the dielectric anisotropy is used in driving.

Recently, LCDs using smectic C* liquid crystal which has ferroelectricity is developed because of its fast response.

A smectic C crystal is a phase in which the molecular director of the liquid crystal is slanted with respect to the smectic layers or about the layer normal, i.e., a unit vector perpendicular to the smectic layer. The angle between the director and the layer normal is constant for fixed temperature and called a "molecular tilt angle". A smectic C* liquid crystal is composed of optically active molecules and thus the director rotates helically along the axis perpendicular to smectic layers. Since this liquid crystal has spontaneous polarization perpendicular to the molecular director, it is called a ferroelectric liquid crystal. The smectic C phase has rotational symmetry about the axis orthogonal to the director, and inversion symmetry about the surface parallel to the smectic layer and perpendicular to the axis orthogonal to the director. Since the smectic C* liquid crystal consists of molecules having chiral parts, the inversion symmetry is broken and the dipole moments are aligned in a direction perpendicular to the director. As a result, a smectic C* liquid crystal shows ferroelectricity with macroscopic spontaneous or permanent polarization. In fact, since the director rotates helically along the axis perpendicular to the smectic layer, the macroscopic spontaneous polarization becomes zero. Therefore, the ferroelectric liquid crystal is often called an improper ferroelectric material. This helical structure can be unwound by the application of an external electric field and a net spontaneous polarization appears above a critical strength of the field.

Now, referring to FIG. 2, a conventional ferroelectric liquid crystal display using chiral smectic C* is described in detail.

A smectic C* liquid crystal 10 is placed between two transparent electrodes 11 and 12.

Smectic layers 20 of the liquid crystal are aligned perpendicular to the electrodes 11 and 12. Since the angle between the director and the axis perpendicular to the smectic layers 20 is constant for fixed temperature and the director rotates helically along the axis perpendicular to the smectic layers 20, the director rotates on the surface of the cone which is symmetrical with respect to the axis perpendicular to the smectic layer 20.

In this state, when the voltage between the electrodes 11 and 12 becomes larger than the critical voltage, the helical structure is unwound and the molecular dipoles are re-arranged along the electric field.

If the gap between the two electrodes 11 and 22 is small enough to suppress the pitch of the helix, the liquid crystal becomes surface stabilized ferroelectric liquid crystal structure, having bistability with ON and OFF states.

The conventional LCD using a ferroelectric liquid crystal has fast response and quasi-stability, but it has poor gray scale.

As mentioned above, the chiral smectic C* liquid crystal is used for LCDs, but non-chiral smectic C liquid crystal has not been used for LCDs so far.

SUMMARY OF THE INVENTION

An object of the present invention is to provide an LCD using a non-chiral smectic C liquid crystal.

Another object of the present invention is to provide an LCD using a non-chiral smectic C liquid crystal having analogue gray scale.

In order to achieve these objects, the present invention uses a non-chiral smectic C liquid crystal between two transparent electrodes. The liquid crystal has smectic layers which are aligned perpendicular to the surfaces of the electrodes and the molecular director is twisted on going from one electrode to the other. A twist angle between the directors defined on the two electrodes lies between zero degree and 180 degrees.

The molecules in the smectic C phase make a constant molecular tilt angle for fixed temperature with respect to the layer normal. The twist angle can be equal to or less than twice the molecular tilt angle, and preferably, is equal to twice the molecular tilt angle. In this case, the desirable materials are such smectic C liquid crystals that have the molecular tilt angle to be 15 degrees to 60 degrees, especially from 40 degrees to 50 degrees. However, the twist angle from zero to 180 degrees is generally possible on going from one electrode to the other.

The pretilt angles on the two electrodes may be adjusted between zero and the molecular tilt angle by proper surface alignment, and the angle between the directors on the two electrodes are equal to twice the molecular tilt angle. As for example, the pretilt angle on one electrode is exactly equal to the molecular tilt angle, and that on the other electrode is less than the molecular tilt angle. It is preferable that the twist angle of zero to 180 degrees is still applicable for this case. The twist of 180 degrees represents the pretilt directions on the two electrodes opposite to each other. The desirable molecular tilt angle is in the range of 40 degrees to 50 degrees.

The liquid crystal display according to the present invention further comprises polarizers attached to the electrodes, respectively. The angle between the polarization axes of the two polarizers is preferably either equal to the twist angle of the molecular director or ±90 degrees plus the twist angle of the molecular director. Another case is that the polarization axes of the two polarizers are either parallel or perpendicular to each other.

Instead of using a pair of polarizers, it is possible to use a polarizer attached to the one electrode and a reflector attached to the other.

The LCD according to the present invention can be operated similarly to the conventional TN or STN LCD. However, the molecular director continuously moves on the surface of an "induced cone" due to the interaction of the force maintaining the molecular tilt angle and the aligning force. The orientation of the molecular director varies responding to the strength of the electric field and thus the gray representation is possible.

BRIEF DESCRIPTION OF THE DRAWINGS

The preferred embodiments of the present invention will now be described more specifically with reference to the attached drawings, wherein.

DETAILED DESCRIPTION OF THE PREFERRED EMBODIMENTS

The preferred embodiments of the present invention will become apparent from a study of the following detailed description, when viewed in light of the accompanying drawings.

Figure 1A:
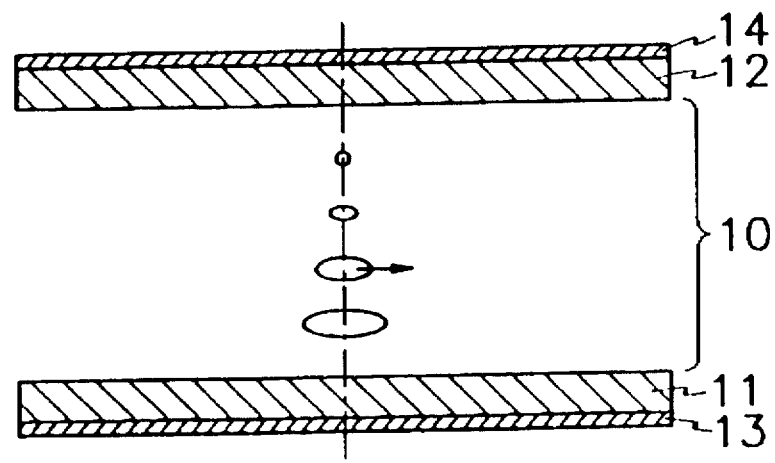
FIGS. 1A and 1B illustrate a TN LCD made of a liquid crystal having positive dielectric anisotropy.
Figure 1B:
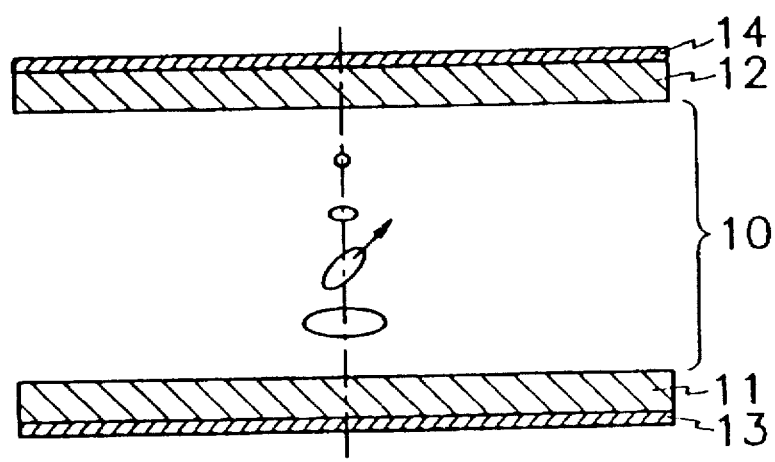
Figure 2:
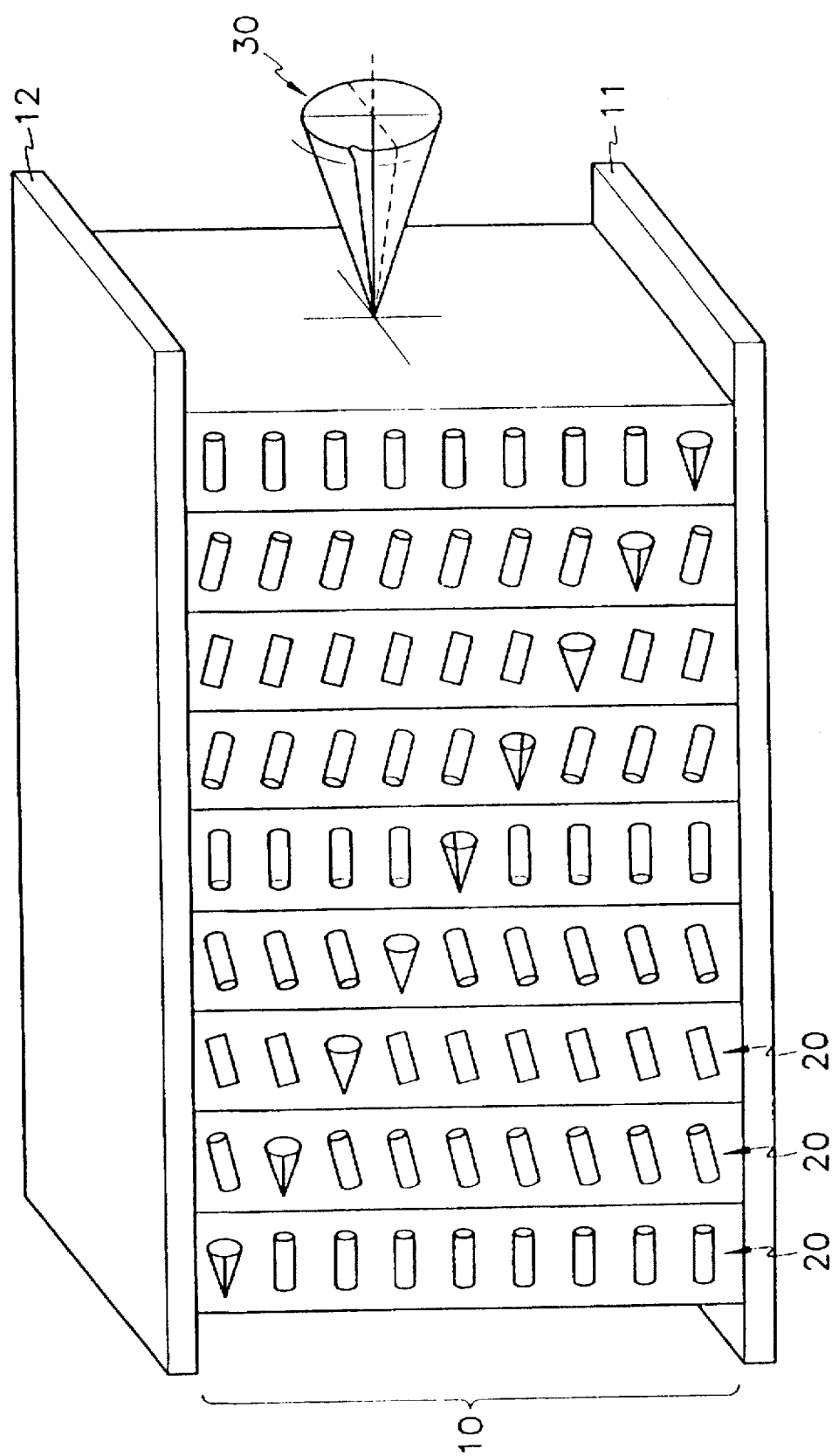
FIG. 2 shows a conventional ferroelectric LCD using chiral smectic C* liquid crystal.
Figure 3:
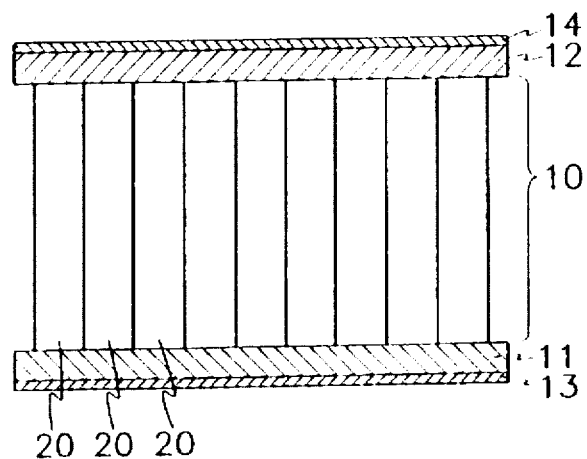
FIG. 3 shows a non-chiral smectic C LCD according to the embodiment of the present invention.

FIG. 3 shows an LCD according to the embodiment of the present invention and FIG. 4 illustrates an "OFF" state where no electric field is applied.

As shown in FIGS. 3, a non-chiral smectic C liquid crystal 10 having either positive or negative dielectric anisotropy lies in between two transparent electrodes 11 and 12. On outer surfaces of two electrodes 11 and 12, a polarizer 13 and an analyzer 14 are attached, respectively.

The smectic layers 20 of the liquid crystal 10 are perpendicular to the surface of the electrodes 11 and 12 and the molecular director of the liquid crystal 10 makes a fixed angle called a "molecular tilt angle" with respect to the layer normal.

The inner surface of each electrode 11 or 12 is coated with alignment layer (not shown) so that the molecular director of the liquid crystal 10 is aligned homogeneously. The alignment layer can be formed with, for example, surfactants such as alkylphenol and hexadecyltrimethylammonium bromide, polyimides, or alignment absorbants coated by the Langmuir-Blodgett film deposition method. The alignment layers are rubbed such that the molecular director of the liquid crystal 10 aligns along a certain direction.

The angle between the rubbing directions on two electrodes is twice the molecular tilt angle.

Then, the molecular director is arranged so that the force maintaining the molecular tilt angle is balanced with the aligning force. FIG. 4 shows the molecules in a smectic layer of a non-chiral smectic C liquid crystal between the two electrodes 11 and 12.

Let x-axis be perpendicular to the smectic layer, y-axis be parallel to the electrodes 11 and 12, which makes 90 degrees with the positive x-axis counterclockwise, and z-axis is perpendicular to the x-y plane, which makes 90 degrees with the y-axis counterclockwise. And a "molecular tilt angle" $\theta_0$ is defined as an angle between the positive x-axis and a molecular director $\bar{n}$, a "horizontal angle" $\theta$ as an angle between the x-axis and the projected director onto the x-y plane, and a "rotational angle" $\phi$ as an angle between the y-axis and the projected director onto the y-z plane. Then the director $\bar{n}$ is represented as $\bar{n}=(\cos\theta, \sin\theta\cos\phi, \sin\theta\sin\phi)$. Furthermore, assume that the horizontal angle $\theta$ is positive when the projected director onto the x-y plane lies in the region where y>0, while negative when in the region where y<0.

The molecular tilt angle $\theta_0$ (>0) is constant for fixed temperature due to the property of the smectic C liquid crystal.

The plane spanned by the directors 17 and 18 are parallel to the surfaces of the electrodes 11 and 12 due to the homogeneous alignment. The rotational angle $\phi$ of the director 17 on the lower electrode 11 is zero and that of the director 18 on the upper electrode is 180 degrees. The magnitudes of the horizontal angle $\theta$ of the directors 17 and 18 are the same, while their signs being different. That is, the horizontal angle $\theta$ of the director 17 is equal to $+\theta_0$, while that of the director 18 to $-\theta_0$.

The horizontal angle $\theta$ in the bulk varies continuously from $+\theta_0$ to $-\theta_0$ through the liquid crystal slab.

As a result, the director is twisted by $2\theta_0$ rotated on surface of an "induced cone" 40.

Therefore, the rotational angle $\phi$ in the region from the surface of the lower electrode 11 to the midpoint varies from zero to 90 degrees, and that in the region from the midpoint to the surface of the upper electrode 12 varies from 90 degrees to 180 degrees. And the horizontal angle $\theta$ in the region from the surface of the lower electrode 11 to the midpoint varies from $+\theta_0$ to zero, and that in the region from the midpoint to the surface of the upper electrode 12 varies from zero to $-\theta_0$.

As a result, the difference in the rotational angle $\phi$ between the directors on the electrodes 17 and 18 is 180 degrees and the difference in the horizontal angle $\theta$ is $2\theta_0$, i.e., equal to the angle between the directors on the two electrodes 11 and 12.

I in the presence of an applied voltage, the orientation of the director is distorted. First, let us assume that the liquid crystal has negative dielectric anisotropy. Then, the director tends to be arranged such that it is perpendicular to the electric field, while the molecular tilt angle fixed. Therefore, the director rotates on the surface of the induced cone 40 toward the direction perpendicular to the field. It takes a minimal path from the initial state to the stable state.

So, the director in the region from the lower electrode 11 to the midpoint, i.e., in the region where $0<\theta<+\theta_0$, tends to rotate by $\theta=+\theta_0$ on the induced cone. On the other hand, the director in the region from the midpoint to the lower electrode 11, i.e., in the region where $-\theta_0<\theta<0$, rotates by $\theta=-\theta_0$ do on the induced cone. Therefore, an inversion wall separating the two regions is produced in the middle of the liquid crystal 10.

Next, let us assume the liquid crystal have positive dielectric anisotropy. Then, the director tends to be arranged such that it is parallel to the electric field, with the molecular tilt angle fixed. Since the force due to the electric field is less than the force maintaining the molecular tilt angle, the director must keep the molecular tilt angle fixed. Therefore, the director, except for near the electrodes 11 and 12, becomes to rotate on the surface of the induced cone 40 toward the position $\theta=0$. The rotational angle $\phi$ of this position is 90 degrees.

Since the degree of the director rotation depends on the strength of the applied field, a continuous electro-optic effect is achieved as a function of the field strength.

The operation of the LCD made up with a non-chiral smectic C liquid crystal having negative dielectric anisotropy according to the embodiment will be now described.

In absence of an electric field, the director maintains the twisted state along the induced cone. Assume that a linearly polarized light through the polarizer 13 and the electrode 11 is incident vertically on the electrode 11 along the surface normal. Then, this twisted non-chiral smectic C structure appears optically similar to the TN LCD because the optical eigenmodes of the sample are linearly polarized when $\Delta n d >> \lambda$ with $\Delta n$ the birefringence and $\lambda$ the wavelength of the incident light. Therefore, a linearly polarized light incident on this structure rotates through an angle of the twist.

If the angle between the polarization axes of the analyzer 14 and the polarizer 13 is the same as the twist angle of the molecular director through the liquid crystal slab, the polarization of the light reaching at the analyzer 14 is parallel to that of the analyzer 14 and thus the light passes through the analyzer 14.

If the angle between the polarization axes of the analyzer 14 and the polarizer 13 is different by ±90 degrees from the twist angle of the molecular director, the polarization of the light reaching at the analyzer 14 is perpendicular to that of the analyzer 14 and thus the light does not pass through the analyzer 14.

When an electric field is applied to the liquid crystal, the molecular director tends to orient perpendicular to the field direction on the surface of the induced cone provided that the liquid crystal has negative dielectric anisotropy. If the strength of the electric field is sufficiently high, the molecular director becomes perpendicular to the field direction. If the applied field is not sufficient, the molecules experience some degree of orientational distortions. The molecules near the electrodes maintain their homogeneous alignment since the aligning forces present in the alignment layers 17 and 18 are larger than the electric force.

Figure 4A:
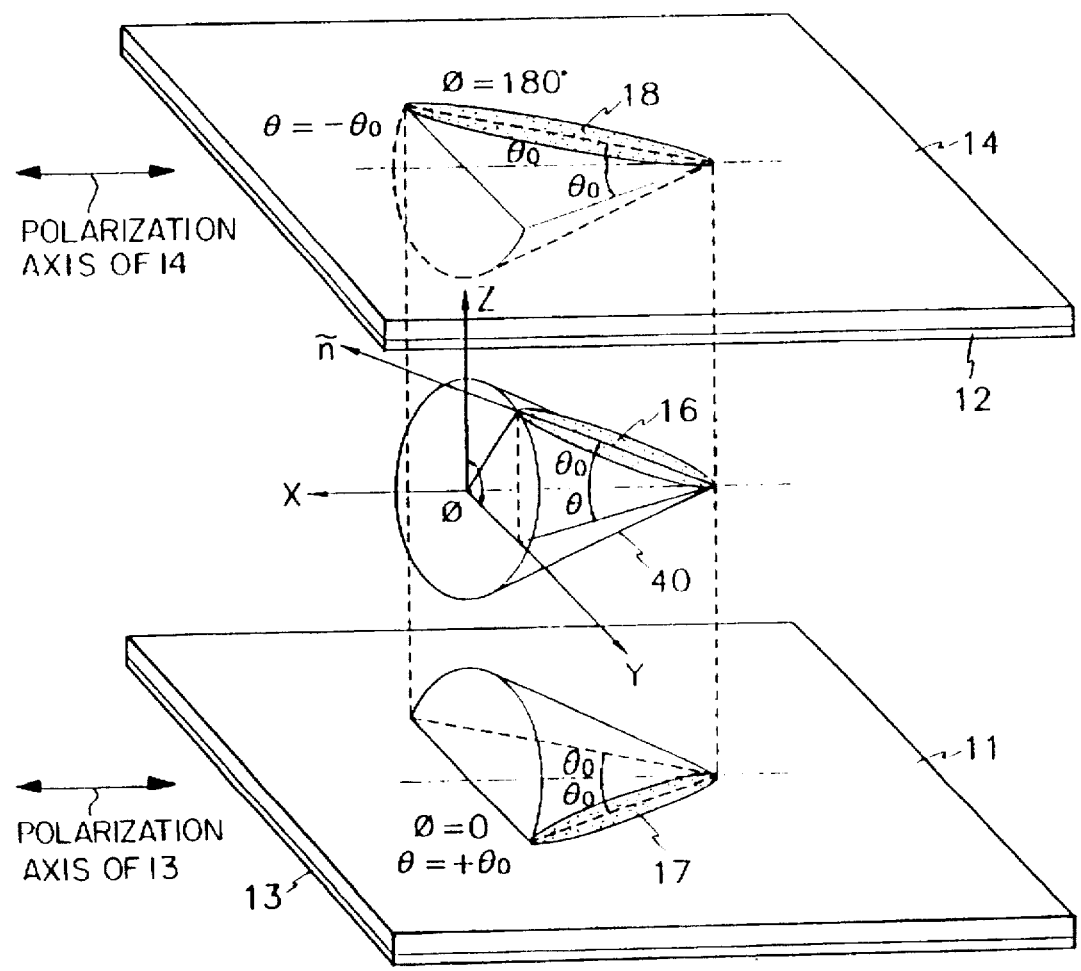
FIGS. 4A and 4B show the molecules in a smectic layer of a non-chiral smectic C LCD with parallel and crossed polarizes, respectively according to the embodiment of the present invention.
Figure 4B:
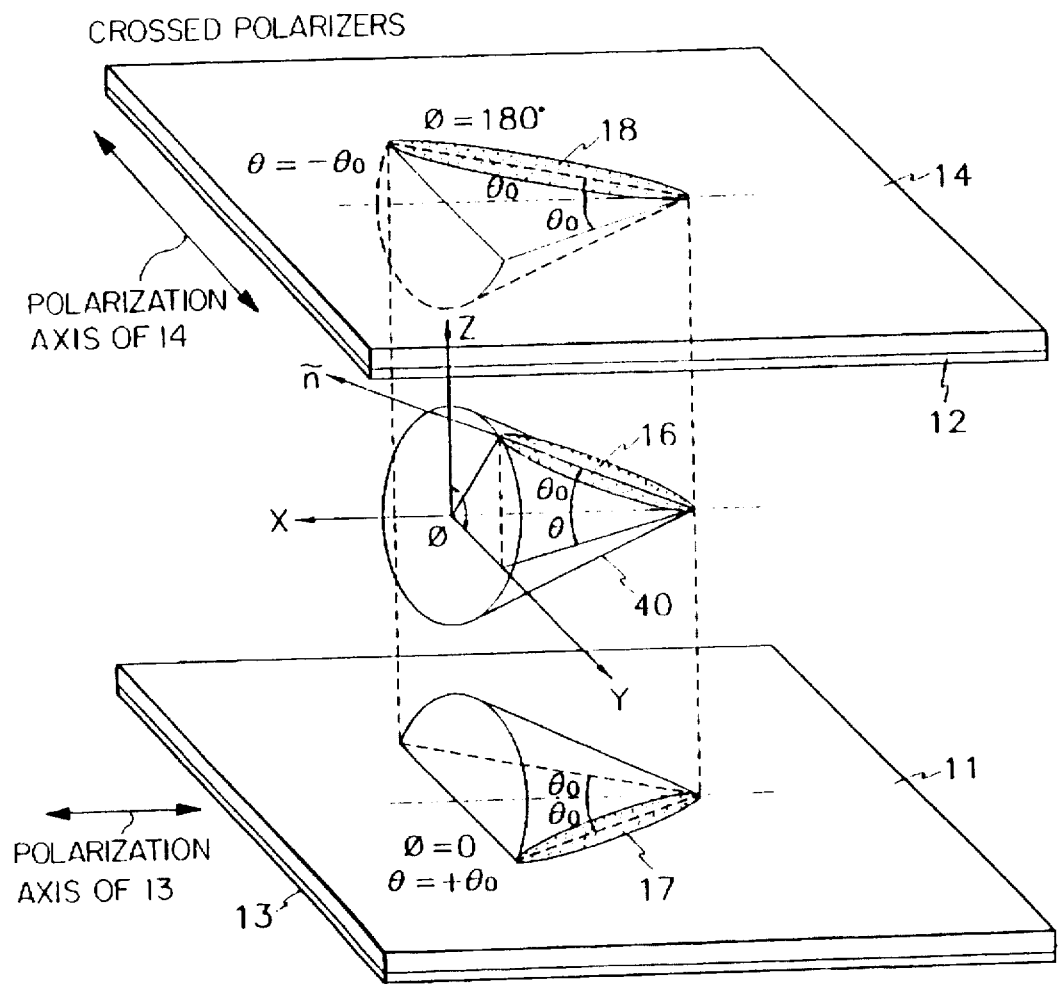

Under a sufficiently high electric field, most of the molecules are parallel to the electrodes 11 and 12. The linearly polarized light through the polarizer 13 reaches at the analyzer 14 without any interference. If the polarization axes of the polarizer 13 and the analyzer 14 are perpendicular to each other, as shown in FIG. 4B the light hardly passes through the analyzer 14 since the polarization of the light is perpendicular to that of the analyzer 14. But if the polarization axes of the polarizer 13 and the analyzer 14 are parallel to each other, as shown in FIG. 4A the light passes through the analyzer 14.

As described above, a non-chiral smectic C LCD according to this embodiment has homogeneous alignment and the twist angle is twice the molecular tilt angle. However, the scope of this invention is not limited to this embodiment.

For example, one case is that the twist angle and the molecular tilt angle is 45 degrees, and the rotational angle varies by 0 to 90 degrees. In this case, the pretilt angle of the director on the surface of one electrode is equal to the molecular tilt angle, and that of the second electrode may be zero.

The other case is that the twist angle and the molecular tilt angle is 45 degrees, and the rotational angle varies by $-90$ to 90 degrees. In this case, the pretilt angles on the surfaces of the first and the second electrodes may be equal to the molecular tilt angle, respectively, and the angle between the directors on the surfaces of both electrodes is equal to twice the molecular tilt angle.

Figure 5:
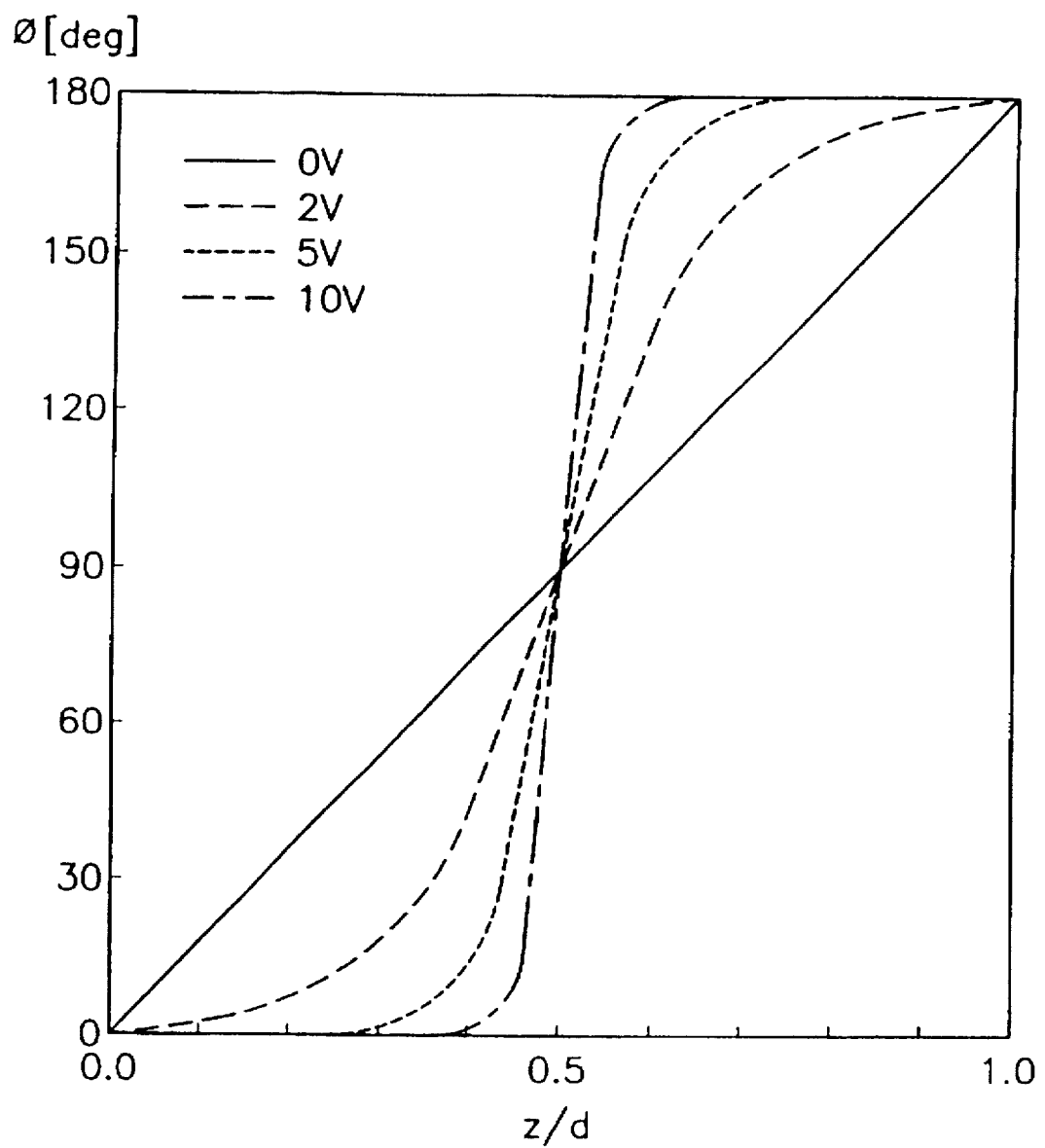
FIG. 5 is a diagram showing the rotational angle $\phi$ (z/d) for z/d.
Figure 6:
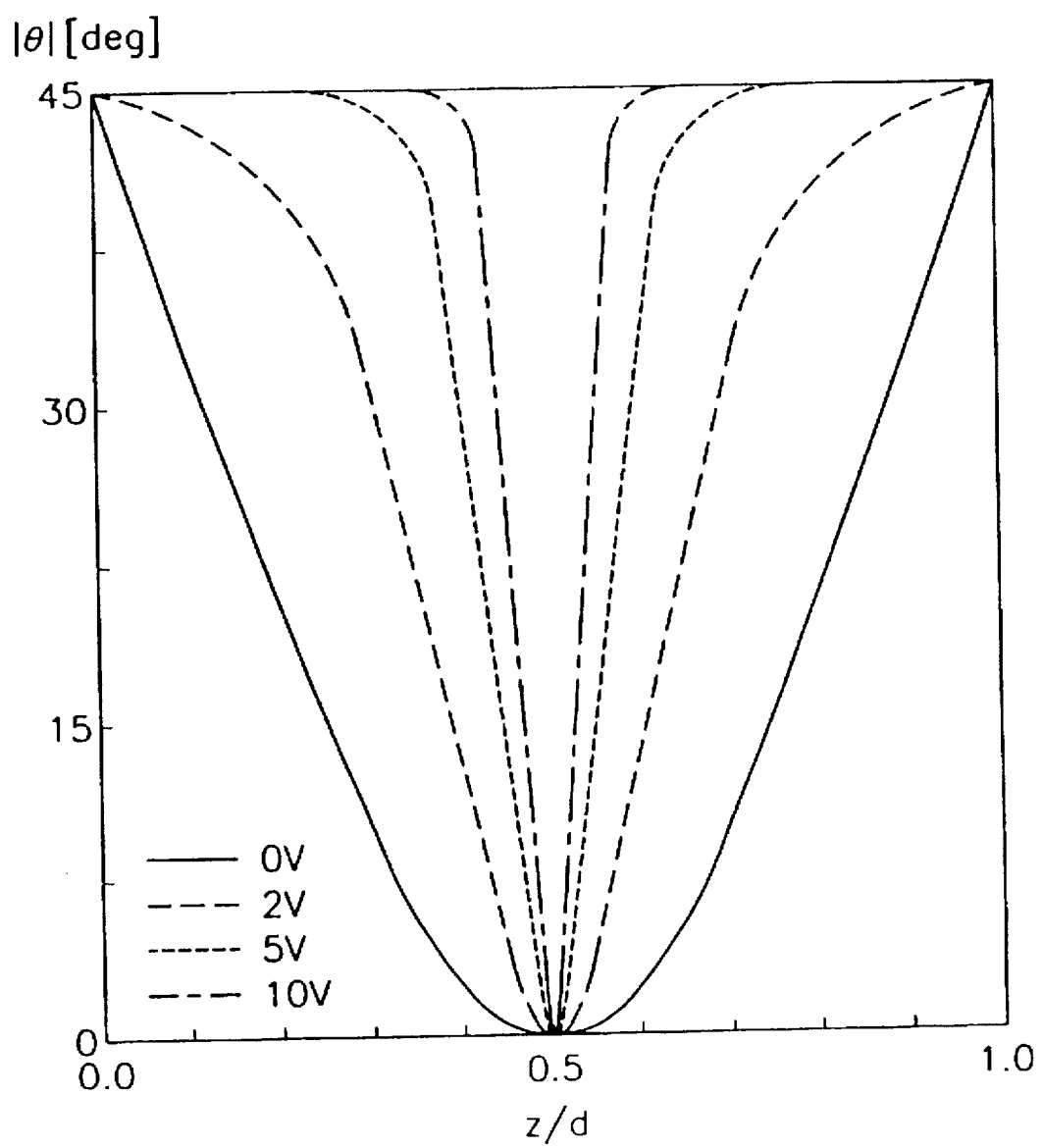
FIG. 6 is a diagram showing the angle $\theta$ (z/d) between the projected director onto the x-y plane and x-axis as a function of z/d.
Figure 7:
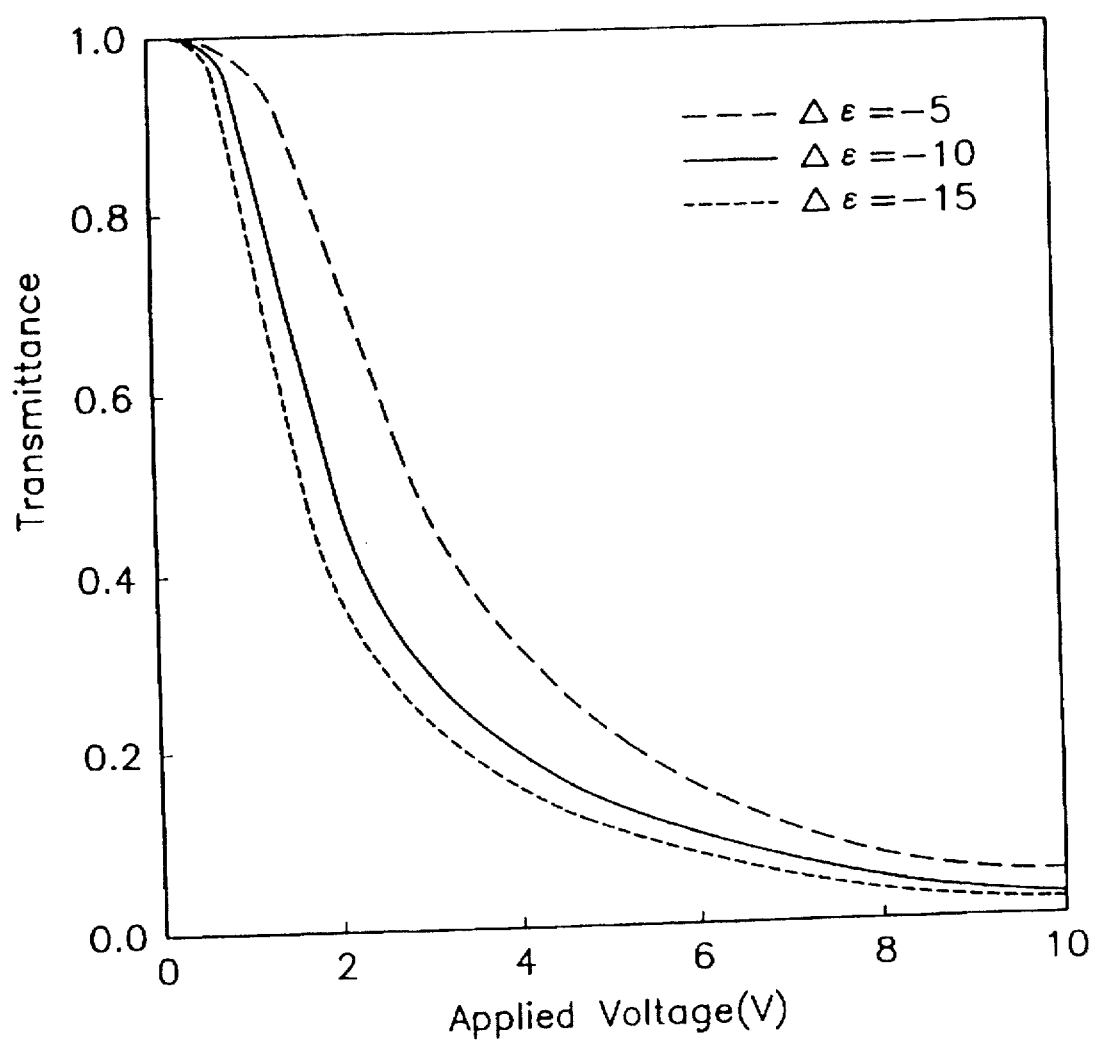
FIG. 7 is a diagram showing the transmittance of light through the LCD as a function of applied voltage.

FIGS. 5 to 7 are graphs related to an LCD with negative dielectric anisotropy, where the molecular tilt angle is 45 degrees, and the twist angle is 90 degrees, twice the molecular tilt angle.

FIG. 5 is a graph showing the rotational angle $\phi$ as a function of z/d for applied voltages of 0, 2, 5, 10 V, where z is a distance from the lower electrode along z-axis and d is a distance between the electrodes. The dielectric anisotropy $\Delta\epsilon$ of the liquid crystal is $-10$ and d is 10 microns. As shown in FIG. 5, the rotational angle $\phi$ is almost nearly proportional to z in the absence of an electric field. However, it becomes to approach zero in the lower region of z/d<0.5 and 180 degrees in the upper region of z/d>0.5, as the strength of the field increases.

FIG. 6 is a graph showing the magnitude of the horizontal angle $\theta$ as a function of z/d for applied voltages of 0, 2, 5, 10 V, where z is a distance from the lower electrode along z-axis and d is a distance between the electrodes. As shown in FIG. 6, the magnitude of the horizontal angle in both the upper and the lower regions becomes closer to zero and it shows a sharp peak in the middle region, as the strength of the field becomes larger. The peak represents an inversion wall separating the upper and the lower regions.

FIG. 7 shows the transmittance as a function of applied field strength for different dielectric anisotropies. FIG. 7 shows that the curve becomes sharper with increasing the magnitude of the dielectric anisotropy.

As described above, the present invention uses a non-chiral smectic C liquid crystal having a twisted structure and realizes a continuous electro-optic effect.

It is understood that various other modifications will be apparent to and can be readily made by those skilled in the art without departing from the scope and spirit of the present invention. Accordingly, it is not intended that the scope of the claims append hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. A liquid crystal display comprising:

a first transparent electrode;

a second transparent electrode opposite the first electrode; and a non-chiral smectic C liquid crystal disposed between the first and the second electrodes, the liquid crystal having a plurality of smectic layers perpendicular to the first and the second electrodes, and a molecular director which twists on going from the first electrode to the second electrode.

2. The liquid crystal display according to claim 1 wherein the molecular director on a surface of the first electrode and the molecular director on a surface of the second electrode are homogeneously aligned.

3. The liquid crystal display according to claim 2 wherein the molecular director on the surface of the first electrode is twisted relative to the molecular director on the surface of the second electrode to make a twist angle substantially in the range of zero degrees to 180 degrees.

4. The liquid crystal display according to claim 3 wherein the molecular director makes a molecular tilt angle with respect to a layer normal to the smectic layers.

5. The liquid crystal display according to claim 4 wherein the twist angle is substantially equal to or less than twice the molecular tilt angle.

6. The liquid crystal display according to claim 5 wherein the twist angle is substantially equal to twice the molecular tilt angle.

7. The liquid crystal display according to claim 6 wherein the molecular tilt angle is substantially in the range of 15 degrees to 50 degrees.

8. The liquid crystal display according to claim 7 wherein the molecular tilt angle is substantially in the range of 40 degrees to 50 degrees.

9. The liquid crystal display according to claim 1 wherein the molecular director makes a fixed molecular tilt angle with respect to a layer normal to the smectic layers, and the molecular director rotates about the layer normal of the smectic layers by an angle substantially in the range of zero to 180 degrees on going from the first electrode to the second electrode.

10. The liquid crystal display according to claim 9 wherein a pretilt angle of the molecular director on a surface of the first electrode and a pretilt angle of the molecular director on a surface of the second electrode are substantially equal to or less than the molecular tilt angle, and the molecular director on the surface of the first electrode and the molecular director on the surface of the second electrode make an angle substantially equal to twice the molecular tilt angle.

11. The liquid crystal display according to claim 10 wherein the molecular tilt angle is substantially in the range of 15 degrees to 60 degrees.

12. The liquid crystal display according to claim 11 wherein the molecular tilt angle is substantially in the range of 40 degrees to 50 degrees.

13. The liquid crystal display according to claim 9 wherein the molecular director on a surface of the first electrode and the molecular director on a surface of the second electrode make an angle substantially in the range of 80 degrees to 100 degrees.

14. The liquid crystal display according to claim 13 wherein the molecular tilt angle is substantially in the range of 40 degrees to 50 degrees.

15. The liquid crystal display according to claim 8 further comprising a first polarizer attached to the first electrode and a second polarizer attached to the second electrode, each of the first and the second polarizers having a polarization axis.

16. The liquid crystal display according to claim 15 wherein the polarization axes of the first and the second polarizers make an angle substantially equal to the twist angle of the molecular director.

17. The liquid crystal display according to claim 16 wherein the polarization axes of the first and the second polarizers make an angle substantially equal to the twist angle of the molecular director plus or minus 90 decrees.

18. The liquid crystal display according to claim 16 wherein the polarization axes of the first and the second polarizers are substantially parallel to each other.

19. The liquid crystal display according to claim 16 wherein the polarization axes of the first and the second polarizers are substantially perpendicular to each other.

* * * * *

UNITED STATES PATENT AND TRADEMARK OFFICE
CERTIFICATE OF CORRECTION

PATENT NO. : 5,781,265
DATED : July 14, 1998
INVENTOR(S) : Sin-Doo Lee

Page 1 of 2

It is certified that error appears in the above-indentified patent and that said Letters Patent is hereby corrected as shown below:

Column 1, lines 44, 45, replace "is not appeared" with -- does not appear --.
Column 2, line 36, after "that" delete the colon.
Column 3, line 30, replace "pass" with -- passes --.
Column 3, line 34, after "becomes" delete "to be".
Column 3, line 43, after "reaches" delete "at".
Column 3, line 45, after "light" delete the colon.
Column 3, line 55, after "220 degrees" change "o r" to -- or --.
Column 5, line 3, replace "60degrees" with -- 60 degrees --.
Column 5, line 53, replace "polarizes" with -- polarizers --.
Column 6, line 41, replace "fi" with -- ñ --.
Column 7, line 6, replace "th e" with -- the --.
Column 7, line 10, replace "I in" with -- In --.
Column 7, line 14, after "tilt angle" insert -- is --.
Column 7, line 23, after "θ=θ$_o$" delete "do".
Column 7, line 26, replace "have" with -- has --.
Column 7, line 34, replace "becomes to rotate" with -- rotates --.
Column 7, line 50, replace "An" with -- Δn --.

UNITED STATES PATENT AND TRADEMARK OFFICE
CERTIFICATE OF CORRECTION

PATENT NO. : 5,781,265
DATED : July 14, 1998
INVENTOR(S) : Sin-Doo Lee

It is certified that error appears in the above-indentified patent and that said Letters Patent is hereby corrected as shown below:

Column 8, line 11, after "reaches" delete "at".
Column 8, line 49, replace "becomes to approach" with -- approaches --.
Column 9, line 5, replace "append" with -- appended --.

Signed and Sealed this

Third Day of August, 1999

Attest:

Q. TODD DICKINSON

*Attesting Officer*     *Acting Commissioner of Patents and Trademarks*